(12) United States Patent
Angood et al.

(10) Patent No.: US 10,718,602 B2
(45) Date of Patent: Jul. 21, 2020

(54) BEARING MOUNT (71) Applicant: RENISHAW PLC, Wotton-under-Edge, Gloucestershire (GB)

(72) Inventors: Stephen Mark Angood, Portreath (GB); Hugo George Derrick, Stroud (GB); Stephen Paul Hunter, Chipping Sodbury (GB)

(73) Assignee: RENISHAW PLC, Wotton-under-Edge (GB)

( * ) Notice: Subject to any disclaimer, the term of this patent is extended or adjusted under 35 U.S.C. 154(b) by 329 days.

(21) Appl. No.: 15/955,097

(22) Filed: Apr. 17, 2018

(65) Prior Publication Data
US 2018/0306570 A1     Oct. 25, 2018

(30) Foreign Application Priority Data

Apr. 19, 2017  (EP) ..................................... 17275052
Jul. 21, 2017  (EP) ..................................... 17275114

(51) Int. Cl.
*G01B 11/00* (2006.01)
*G01B 5/00* (2006.01)
(Continued)

(52) U.S. Cl.
CPC .......... *G01B 11/005* (2013.01); *G01B 5/0004* (2013.01); *G01B 5/004* (2013.01);
(Continued)

(58) Field of Classification Search
CPC .... G01B 5/012; G01B 21/045; G01B 21/042; G01B 21/047; G01B 5/008; G01B 11/007; G01B 7/012; G01B 21/04
(Continued)

(56) References Cited

U.S. PATENT DOCUMENTS 2,516,020 A   7/1950  Reed
2,789,480 A   4/1957  Wellauer
(Continued)

FOREIGN PATENT DOCUMENTS

CN    2627338 Y     7/2004
CN    101563510 B   9/2014
(Continued)

OTHER PUBLICATIONS

Oct. 27, 2017 Search Report issued in European Patent Application No. 17275054.9.
(Continued)

*Primary Examiner* — Yaritza Guadalupe-McCall
(74) *Attorney, Agent, or Firm* — Oliff PLC (57) ABSTRACT

A coordinate positioning apparatus comprising first and second relatively moveable bodies, at least the first body comprising at least one sheet or plate of material arranged to provide a load-bearing structure comprising a plurality of planar load-bearing members and on which at least one member is mounted to the first body via a mount which is coupled to at least three, non-parallel planar load-bearing members of the first body, such that the planes of said at least three non-parallel planar load-bearing members intersect each other at a common point.

19 Claims, 10 Drawing Sheets

(51) Int. Cl.
  *G01B 21/04* (2006.01)
  *G01B 7/004* (2006.01)
  *G01B 5/008* (2006.01)
  *G01B 5/004* (2006.01)

(52) U.S. Cl.
  CPC ............. *G01B 5/008* (2013.01); *G01B 7/004* (2013.01); *G01B 11/002* (2013.01); *G01B 21/04* (2013.01)

(58) Field of Classification Search
  USPC .......................................................... 33/503
  See application file for complete search history.

(56) References Cited

U.S. PATENT DOCUMENTS

| | | | |
|---|---|---|---|
| 3,639,993 A * | 2/1972 | Sartorio | B23Q 11/001 33/572 |
| 3,749,501 A | 7/1973 | Wieg | |
| 3,831,283 A | 8/1974 | Pagella et al. | |
| 4,138,822 A | 2/1979 | Parodi et al. | |
| 4,651,439 A | 3/1987 | Band et al. | |
| 4,680,868 A | 7/1987 | Orr et al. | |
| 4,882,847 A | 11/1989 | Hemmelgarn et al. | |
| 4,964,220 A | 10/1990 | Orr et al. | |
| 5,042,162 A * | 8/1991 | Helms | F16F 7/1005 248/559 |
| 5,063,683 A | 11/1991 | Bury | |
| 5,094,549 A | 3/1992 | Lyon | |
| 5,125,163 A | 6/1992 | Bury | |
| 5,173,613 A | 12/1992 | Henry et al. | |
| 5,247,749 A | 9/1993 | Bury | |
| 5,287,629 A | 2/1994 | Pettersson | |
| 5,388,342 A | 2/1995 | Garau et al. | |
| 5,388,343 A | 2/1995 | Garau et al. | |
| 5,402,981 A | 4/1995 | McMurtry | |
| 5,505,004 A | 4/1996 | Pettersson | |
| 5,621,978 A | 4/1997 | Sarauer | |
| 5,758,429 A | 6/1998 | Farzan et al. | |
| 5,832,416 A | 11/1998 | Anderson | |
| 5,848,480 A | 12/1998 | Sola et al. | |
| 6,047,610 A * | 4/2000 | Stocco | B25J 17/0266 74/479.01 |
| 6,050,048 A | 4/2000 | Hellsten | |
| 6,058,618 A | 5/2000 | Hemmelgarn et al. | |
| 6,161,298 A | 12/2000 | Bernhardt et al. | |
| 6,202,316 B1 | 3/2001 | Swift et al. | |
| 6,272,760 B1 * | 8/2001 | Wiedmann | G01B 5/008 33/1 M |
| 6,834,471 B2 | 12/2004 | Takagi et al. | |
| 7,191,541 B1 | 3/2007 | Weekers et al. | |
| 7,533,574 B2 | 5/2009 | McMurtry et al. | |
| 8,739,420 B2 | 6/2014 | Tarizzo | |
| 9,109,747 B2 | 8/2015 | Schernthaner | |
| 10,488,843 B2 * | 11/2019 | Vesco | G05B 19/401 |
| 2003/0037451 A1 | 2/2003 | Sarauer | |
| 2003/0218457 A1 | 11/2003 | Aiba et al. | |
| 2004/0250434 A1 | 12/2004 | Ogura et al. | |
| 2004/0250503 A1 | 12/2004 | Bigelow | |
| 2005/0097766 A1 | 5/2005 | Weekers et al. | |
| 2007/0040453 A1 | 2/2007 | Aoki et al. | |
| 2007/0220767 A1 | 9/2007 | Pettersson | |
| 2010/0018153 A1 | 1/2010 | Garau | |
| 2012/0041712 A1 | 2/2012 | Pettersson | |
| 2015/0028699 A1 | 1/2015 | Hofstetter et al. | |
| 2016/0274565 A1 * | 9/2016 | Vesco | G01C 5/04 |
| 2018/0304276 A1 * | 10/2018 | Hunter | B03C 1/30 |
| 2018/0306570 A1 * | 10/2018 | Angood | G01B 11/002 |
| 2018/0309354 A1 * | 10/2018 | Angood | G01B 21/047 |
| 2020/0080830 A1 * | 3/2020 | Hunter | G01B 5/0004 |

FOREIGN PATENT DOCUMENTS

| | | |
|---|---|---|
| DE | 3107783 A1 | 9/1982 |
| DE | 3927525 C2 | 2/1991 |
| DE | 4132655 A1 | 4/1993 |
| DE | 4325337 A1 | 2/1994 |
| DE | 4345094 A1 | 7/1995 |
| DE | 29705152 U1 | 7/1997 |
| DE | 10055188 A1 | 5/2002 |
| DE | 10215188 A1 | 10/2003 |
| DE | 102004047525 A1 | 4/2006 |
| DE | 102006027898 B3 | 7/2007 |
| DE | 102016101695 A1 | 8/2016 |
| EP | 0268659 A1 | 6/1988 |
| EP | 0589565 A2 | 3/1994 |
| EP | 0957332 A2 | 11/1999 |
| EP | 1463185 A2 | 9/2004 |
| EP | 1854577 B1 | 11/2007 |
| EP | 2089592 B1 | 8/2009 |
| EP | 1500903 B9 | 5/2012 |
| FR | 1397480 A | 4/1965 |
| GB | 2095143 A | 9/1982 |
| GB | 2262319 B | 3/1995 |
| JP | S61/90850 A | 5/1986 |
| JP | H05/312556 A | 11/1993 |
| JP | H08-114442 A | 5/1996 |
| JP | 2003/309963 A | 10/2003 |
| SU | 1167413 A1 | 7/1985 |
| WO | 89/09677 A1 | 10/1989 |
| WO | 89/09887 A1 | 10/1989 |
| WO | 91/03145 A1 | 3/1991 |
| WO | 2005/043552 A1 | 5/2005 |
| WO | 2007/093789 A1 | 8/2007 |
| WO | 2007/128431 A2 | 11/2007 |
| WO | 2007/144906 A1 | 12/2007 |
| WO | 2010/106079 A1 | 9/2010 |

OTHER PUBLICATIONS

Sep. 6, 2018 Extended Search Report issued in European Patent Application No. 18167645.3.
Oct. 6, 2017 Search Report issued in European Patent Application No. 17275053.1.
May 25, 2018 Search Report issued in European Patent Application No. 18167707.1.
Nov. 29, 2017 Search Report issued in European Patent Application No. 17275114.1.
Oct. 4, 2017 Search Report issued in European Patent Application No. 17275052.1.
May 25, 2018 Search Report issued in International Patent Application No. PCT/GB2018/050996.
"Linear Ball Bushings"; Automotion Components brochure; automotioncomponents.co.uk; pp. 544-609.
Thomson; "Thomson RoundWay Linear Roller Bearings"; Thomson brochure; www.thompsonlinear.com; pp. 1-6.
Thompson; "RoundWay Roller Bearings"; Thomson web page; http://www.thomsonlinear.com/website/com/eng/products/linear_guides/linear_specialty; [retrieved Sep. 5, 2014].
Connelly, R; "The basics of rigidity: Lectures I and II, Session on Granlular Matter Institut Henri Poincaré"; Cornell University; http://www.math.cornell.edu/~connelly/Basicsl.Basicsll.pdf.
Ziegert, John; "Design and Testing of a High Speed, 5-DOF, Coordinate Measuring Machine with Parallel Kinematic Structure"; University of Florida; pp. 1-4.
"I-beam"; Wikipedia article; pp. 1-5; https://en.wikipedia.org/wiki/I-beam; accessed Jan. 24, 2019.
"Revolution CMM Models"; Advanced Industrial Measurement Systems; pp. 1-10; http://aimsmetrology.com/revolution-cmm-models/; copy of webpage from Apr. 18, 2016; [retrieved Jan. 31, 2019].
Renishaw plc; "Equator 300 gaging system"; Renishaw datasheet H-5504-8200-01; www.renishaw.com; 2010.
Renishaw plc; "Equator versatile gauge with MODUS software"; Renishaw brochure H-5504-8200-07-A; www.renishaw.com; 2015.

* cited by examiner

BEARING MOUNT

This invention relates to a mount/load spreader, in particular for a coordinate positioning apparatus such as a coordinate measuring machine (CMM), in particular a Cartesian coordinate positioning apparatus/CMM, for example a bearing mount/load spreader for a coordinate positioning apparatus.

A Cartesian coordinate positioning apparatus is one in which a tool mounted on the apparatus is moveable relative to a part to be inspected or worked on, by a movement system comprising three linear axes that are arranged in series, and arranged generally mutually perpendicular to each other (and generally designated as an x, y and z axis). Typical Cartesian coordinate positioning apparatus include Bridge, Cantilever, Horizontal Arm, and Gantry type machines.

It is common for coordinate positioning apparatus, in particular Cartesian CMMs, to have a structure made from heavyweight materials such as granite. Indeed, it is common for a significant proportion of a Cartesian CMM to be made from granite. For instance, is quite normal for the workpiece platform (also known as a workpiece table), the moveable parts of the machine and the bearing surfaces for the moveable parts to be made from granite.

The theory underlying the use of heavyweight materials and structures is that it is important that the CMM does not distort under a) the weight of a part to be measured that is located on the platform, and/or b) the moving weight of the various moveable parts of the CMM (for example, the bridge of a bridge-type CMM which moves back and forth along an axis, and which typically bears on the platform).

It is also generally desirable that the machine is stable in the event of environmental temperature changes. Accordingly, structures made from high-density materials which have a large thermal inertia, e.g. granite, have traditionally been used when making CMMs in order to achieve such stability.

Several attempts have been made to produce lighter-weight CMMs, and/or CMMs which utilise mechanical bearings as opposed to air bearings. For example U.S. Pat. Nos. 5,402,981, 6,202,316, 5,125,163, 5,173,613, EP0268659, U.S. Pat. No. 5,063,683, WO89/09887 and U.S. Pat. No. 8,739,420 describe various example machines which are designed to reduce/avoid the use of granite and other heavyweight materials.

Minimising the use of heavyweight materials and making a CMM as lightweight as possible can provide several benefits. For example, it can reduce the amount of material needed and hence wasted. A lightweight CMM can be run more efficiently and cheaply by a user since less energy is needed to operate the CMM. Further still, the moveable members of a lightweight CMM have low inertia, thereby reducing bending caused by inertia during acceleration; this can lead to better measurement throughput.

The present invention concerns improvements in coordinate positioning apparatus comprising load bearing structures made from sheet or plate material. Such load-bearing structures can be useful in facilitating a lightweight structure. Accordingly, the present invention can be useful in providing an improvement in a lightweight measuring machines having a sheet/plate material load-bearing structure.

The present invention relates to a coordinate positioning apparatus, at least a part of the structure of which is made from sheet or plate material (for example sheet or plate metal). In particular, at least one structure on which something is mounted (e.g. a bearing part is provided/mounted) can itself be formed from sheet or plate material. For example, at least a movable member of the measuring machine can (predominantly) be made from sheet or plate material.

In particular, the present invention relates to an improved load-bearing structure, for example a load-bearing structure comprising at least one sheet or plate of material configured to provide a plurality of planar load-bearing members/facets. A member (for example a bearing member, machine cover(s) and/or members/devices) can be mounted to load-bearing structure via a mount/load spreader which is secured to at least two non-parallel planar load-bearing members/facets, e.g. of a (closed) box load-bearing structure, and optionally secured to at least three non-parallel planar load-bearing members/facets.

According to a first aspect of the invention there is provided a coordinate positioning apparatus comprising at least a first body (and optionally a second relatively moveable body). At least the first body can comprise at least one sheet or plate of material arranged to provide a load-bearing structure (e.g. a sheet/plate material load-bearing structure). Accordingly, the first body (e.g. its load-bearing structure) can comprise a plurality of planar load-bearing members. At least one member can be mounted thereon. For example, at least a first bearing member can be mounted thereon for cooperation with, and preloaded against, a bearing surface on a second body. The at least one member can be mounted to the first body via a mount (e.g. a mounting member/load spreader) which is coupled to at least three non-parallel planar load-bearing members (e.g. "facets") of the first body. In other words, the mount/load spreader can be coupled to three planar load bearing members which are non-parallel to each other.

The three non-parallel planar load-bearing members of the first body to which the mount is coupled could be arranged such that the planes of said at least three non-parallel planar load-bearing members intersect each other at a common point (in other words, there is one point at which all the planes intersect each other).

An apparatus configured in accordance with the invention, means that that loads on the (e.g. bearing) member can be spread into the three non-parallel planar load-bearing members. Accordingly, the mount could be referred to as a load spreader. This has been found to enable a substantial increase in weight saving. It has been found to enable relatively thin sheets/plates (e.g. 10 mm or less, for example 8 mm or less, for instance 5 mm or less, optionally 2 mm or less, and even 1 mm or less) to be used to form the load-bearing structure of the coordinate positioning apparatus. Accordingly, the planar load-bearing members to which the load spreader member is secured can comprise thin sheet/plate material (e.g. 10 mm or less, for example 8 mm or less, for instance 5 mm or less, optionally 2 mm or less, and even 1 mm or less). Optionally, at least one of the at least one sheet or plate of material of the load-bearing structure is folded, e.g. so as to form at least two of planar load bearing members.

The mount/load spreader can be coupled to the at least three non-parallel planar load-bearing members of the first body substantially in/at the corner at which said planar load-bearing members converge toward, and optionally meet/join. Accordingly, the mount/load spreader could be a corner mount/load spreader. Optionally, the mount/load spreader is a snug/close fit within the corner at which said planar load-bearing members converge toward.

The mount/load spreader can comprise at least three substantially planar surfaces, the planes of which intersect at a common point (in other words, there is one point at which all the planes intersect each other). Each planar surface of the mount/load spreader can be mounted to a corresponding one of the at three non-parallel planar load bearing member. The planes of at least three substantially planar surfaces of the mount/load spreader can be substantially mutually orthogonal.

The at least three non-parallel planar load-bearing members of the first body can be substantially adjoining/adjacent/connecting, and optionally substantially mutually adjoining/adjacent/connecting. Optionally, the mount is connected to three non-parallel planar load-bearing members of the first body, in which each of the planar load-bearing members share a boundary along a line (in other words an elongate boundary, e.g. as opposed to meeting at a point) with the other two planar load-bearing members, e.g. such that they (or at least their planes) form a three-sided pyramidal-shaped corner feature. As will be understood, the three non-parallel planar load-bearing members need not directly touch/engage each other. For example, they could be connected to each other by a coupling member, e.g. the mount/load spreader. Optionally, the at least three non-parallel planar load-bearing members of the first body are mutually joined to each other, e.g. by being formed from the same sheet/plate of material (which has been folded to provide different planar load-bearing members) and/or by securing different sheets/plates of material together, such as via welding and/or adhesive.

The apparatus can be configured such that the line of a resultant reaction force on the first bearing member passes close to or through the point of intersection of the planes of the at least three non-parallel planar load-bearing members. This could be such that the resultant reaction force can predominantly (and preferably substantially) resolved directly into any, and optionally all, of the at least three non-parallel, planar load-bearing members. This could be such that the resultant reaction force does not impart any substantial bending moments into the load-bearing structure. Optionally, the apparatus can be configured such that the line of a resultant reaction force on the first bearing member passes through the mount/load spreader (which couples the first bearing member to the first body).

For example, the apparatus can be configured such that the resultant reaction force passes within a notional region centred on the point of intersection of the planes of the at least three non-parallel planar load-bearing members, and having a radius of 50 mm, optionally a radius of 25 mm, for example a radius of 10 mm, for instance a radius of 5 mm. Optionally, the radius (of the notional region) is five times the thickness of the thinnest of the planar load-bearing members to which the first bearing member is mounted, optionally three times, for example two times. Optionally, the apparatus is configured such that the resultant reaction force passes within a notional volume defined by the intersection of a first pair of planes containing the front and back surfaces of a first of the three non-parallel planar load bearing members, a second pair of planes containing the front and back surfaces of a second of the three non-parallel planar load bearing members, and a third pair of planes containing the front and back surfaces of a third of the three non-parallel planar load bearing members.

The at least one sheet or plate of material can be arranged to form a box load-bearing structure, for example a substantially closed box load-bearing structure. Accordingly, the at least two/three non-parallel planar load-bearing members can form part of the box. In other words, at least one of, for example at least two of, and optionally at least three of the at least three non-parallel planar load-bearing members can form part of the exterior/outer-shell of the box. In other words, at least one of, for example at least two of, and optionally at least three of the at least three non-parallel planar load-bearing members can define part of the boundary of box's enclosed/internal volume. As will be understood, the (e.g. exterior/outer) planar load-bearing members of a closed box load-bearing structure need not necessarily be solid sheets/plates. For example, they can comprise opening/holes therein. For example, a side of the closed box could comprise a planar lattice structure, or a plurality of strips of sheet or plate material arranged to provide a planar load bearing configuration. Accordingly, a closed box load-bearing structure can comprise a load-bearing structure comprising a plurality of planar load-bearing members arranged such that there is at least one planar load bearing member on each side of the load-bearing structure.

Optionally, the at least three non-parallel planar load bearing members comprise predominately (optionally substantially) solid sheet/plate material. Optionally, all sides of the closed box load-bearing structure comprise predominately (optionally substantially) solid sheet/plate material.

As will be understood, the at least three non-parallel planar load bearing members could comprise first, second and third planar load bearing members, e.g. such that the at least one first bearing member is mounted to the first body via a mount/load spreader which is coupled to first, second and third planar load bearing members of the load bearing structure. Optionally, the first planar load bearing member is joined along a line to both the second and third planar load bearing member Optionally, for two planar load bearing members that meet/share a boundary along a line, the angle between the planes of those planar load bearing members is not more than 45 away from being perpendicular to each other, for example not more more than 45° away from being perpendicular to each other, for example not more than 25° away from being perpendicular to each other, for instance not more than 10° away from being perpendicular to each other. Optionally, said two planar load bearing members that meet/share a boundary along a line are substantially perpendicular to each other.

Accordingly, optionally, at least two of the at least three non-parallel planar load-bearing members are substantially orthogonal to each other. Optionally, the at least three non-parallel planar load-bearing members are substantially mutually orthogonal to each other.

The mount/load spreader can be secured to the face of at least one, optionally at least two, and for example at least three, of the at least three non-parallel planar load-bearing members. For example, the mount/load spreader can be secured to the inside surface of at least one, optionally at least two, and for example at least three, of the at least three non-parallel planar load-bearing members. The mount/load spreader could be mounted over an expanse of the face of a planar load bearing member, e.g. over at least 1cm$^2$, for example over at least 2 cm$^2$, for instance over at least 5 cm$^2$, optionally over at least 10 cm$^2$, such as over at least 25 cm$^2$, for example over at least 50 cm$^2$. Optionally, the mount is secured to the edge of at least one, optionally at least two, and for example at least three, of the at least three non-parallel planar load-bearing members. The edge could be an edge of an aperture in a planar load-bearing member, for example a (e.g. circular) hole in the planar load-bearing member.

Optionally, the mount/load spreader is secured over/to the face two of the at least three non-parallel planar load-bearing members, and to the edge of one of the at least three non-parallel planar load-bearing members, for example to the edge of an aperture in one of the at least three non-parallel planar load-bearing members.

The mount/load spreader can be mechanically fastened to a planar load-bearing member, for example via a mechanical fastener, such as rivet, bolt and/or clamp.

The mount can be welded to a planar load-bearing member. The mount can be glued/adhered to a planar load-bearing member. The mount can be coupled to a planar load-bearing member via a combination of coupling techniques, e.g. mechanical fastener, welding and/or gluing.

Optionally, the thickness of at least one, optionally at least two, for example at least three, of the at least three non-parallel planar load-bearing members (to which the mount is coupled) is not more than 5 mm. In other words, optionally the thickness of at least one of the three non-parallel planar load bearing members to which the first bearing member is mounted is not more than 5 mm. Typically, and for the purposes of this application, if the thickness is above 5 mm, then the material tends to be referred to as plate material, whereas if the thickness is 5 mm or below, the material tends to be referred to as sheet material. Accordingly, optionally the load-bearing structure comprises sheet material arranged to provide said load-bearing structure. Optionally, the thickness of at least one, optionally at least two, for example at least three, of the at least three non-parallel planar load-bearing members (to which the mount is coupled) is not more than 3 mm, for instance not more than 2 mm, for example not more than 1 mm. In other words, optionally the thickness of at least one of the three non-parallel planar load bearing members to which the first bearing member is mounted is not more than 3 mm, for instance not more than 2 mm, for example not more than 1 mm.

The first and second bodies can be relatively moveable in a (first) linear degree of freedom. Optionally, the first body is mounted on and moveable relative to a third body, or vice versa, in another (second) linear degree of freedom. The first and second linear degrees of freedom could be substantially orthogonal. Optionally, the third body is mounted on and moveable relative to a fourth body, or vice versa, in a further (third) linear degree of freedom. The second and third linear degrees of freedom could be substantially orthogonal. Accordingly, optionally, the first, second and third linear degrees of freedom could be substantially mutually orthogonal.

Optionally, the first body comprises a carriage and the second body comprises a quill (e.g. a substantially vertically extending and moveable quill). Optionally, the quill comprises a mount for an articulated head and/or a measurement probe. Optionally, the third body comprises a substantially horizontal member/beam (e.g. cross-beam) along which the carriage can travel. Optionally, the fourth body comprises a guideway along which the beam can travel.

Optionally, the first body comprises a bridge, cross-beam or frame (e.g. a portal frame) and the second body comprises a guideway along which the bridge, cross-beam or frame can travel. Accordingly, optionally, the third body comprises a carriage which can travel along the bridge, cross-beam or frame (e.g. along a substantially horizontal beam thereof). Optionally, the fourth body comprises a quill (e.g. a substantially vertically extending and moveable quill).

The mount can comprise the same material as the material of the planar load-bearing member to which it is secured. Optionally, the mount comprises a single/solid unit, i.e. formed as/from a single piece. For example, the mount could be a cast/moulded piece, and/or be machined (e.g. from a single block of material).

The mount and the bearing member can be adjustable relative to each other in at least one degree of freedom.

Optionally, there is provided a biasing device configured to provide said preload. The biasing device can act between the mount and the bearing member so as to provide said preload. The biasing device could comprise a biasing member located between the mount and the bearing member and configured to provide said preload. The biasing device/member could comprise a mechanical biasing member. For example, said biasing member can comprise a spring, for example a coil spring.

Said at least one sheet or plate of material can be sheet or plate metal, for example steel or aluminium. As will be understood, other materials, including alloys, and non-metallic materials could be used (e.g. ceramic and/or carbon fibre).

The at least first bearing member can comprise the part of a bearing which cooperates with and moves along an elongate bearing surface (e.g. rail, track, guideway). Accordingly, the bearing surface (e.g. rail, track, guideway) can be provided on the second body. The at least first bearing member can comprise an air bearing. Optionally, the at least first bearing member comprising an air bearing pad. The at least first bearing member can comprise a mechanical bearing, such as a roller bearing, ball-race bearing or plain bearing.

The coordinate positioning apparatus can be a Cartesian coordinate positioning apparatus. The coordinate positioning apparatus can comprise a coordinate measuring machine (CMM). Optionally, the coordinate positioning apparatus comprises a mount for a tool, such as a probe, for interacting with (e.g. measuring) an object. Said mount could be moveable by, and optionally provided by, the first or second body. Accordingly, the coordinate positioning apparatus can comprise a probe, for example a measurement probe.

Accordingly, this application describes an apparatus comprising a load-bearing structure comprising at least one sheet of material configured to provide a plurality of planar load-bearing members/facets, and in which a member (e.g. a first bearing member) is mounted to load-bearing structure via a load spreader member which is secured to the face of first and second planar load-bearing members/facets, and to the edge of a third planar load-bearing members, in which said first, second and third planar load-bearing members are non-parallel to each other and are arranged such that their planes intersect each other at a common point.

Accordingly, this application describes an apparatus comprising a load-bearing structure comprising at least one sheet of material configured to provide a plurality of planar load-bearing members/facets, and in which a member (e.g. first bearing member) is mounted to load-bearing structure via a load spreader member which is secured to the face of at least three non-parallel planar members/facets which are arranged such that their planes intersect each other at a common point.

Embodiments of the invention will now be described, by way of example only, with reference to the following Figures in which:

FIG. 8b shows isometric front and rear views of the second bearing mount/load spreader used in the CMM of FIG. 8a;

FIG. 8c is a detail view of the region A identified in FIG. 8a; and

FIG. 8d shows an isometric rear view, and a side view, of the first bearing mount/load spreader used in the CMM of FIG. 8a.

Figure 1:
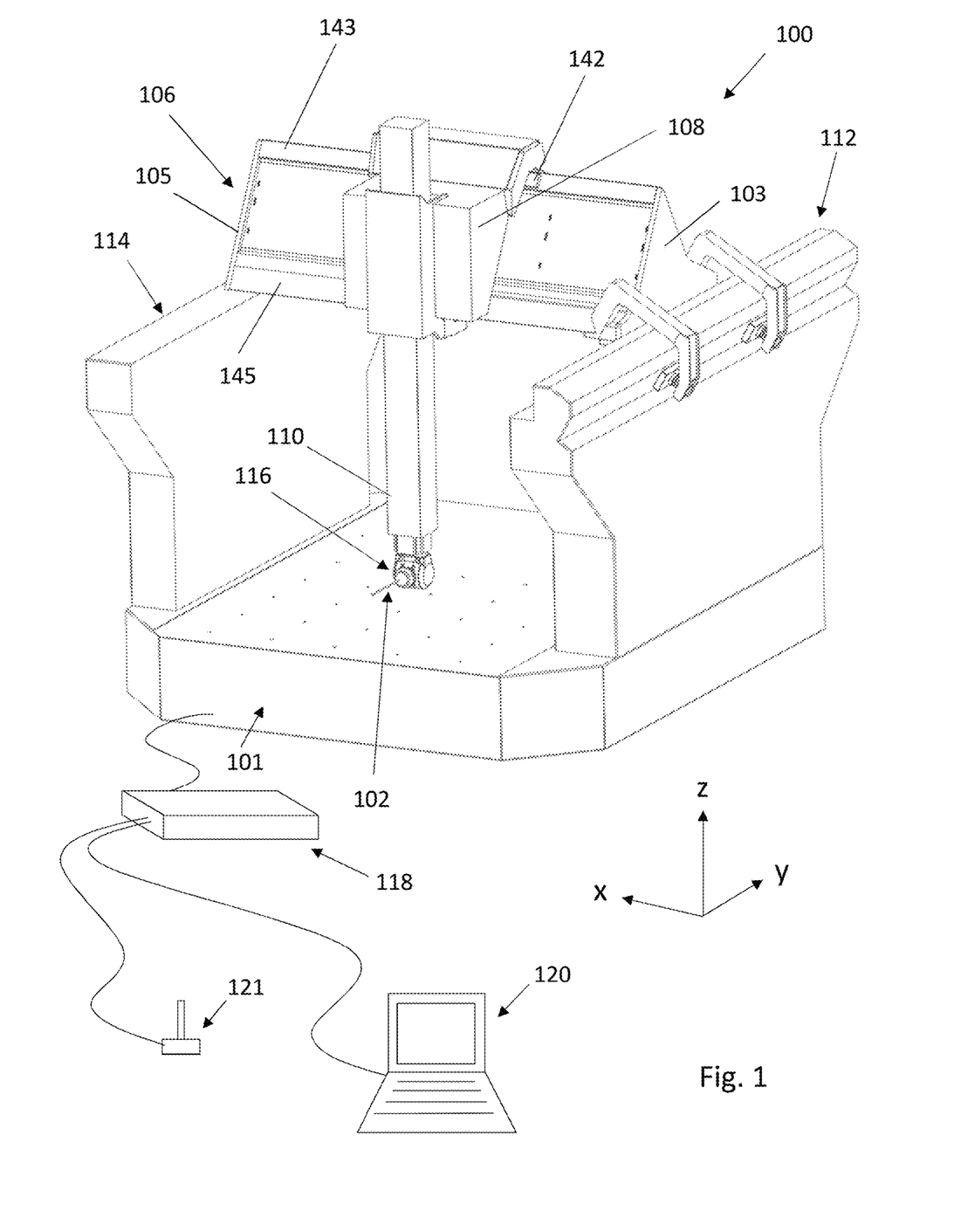
FIG. 1 is a schematic isometric view of the front of a gantry-type Cartesian CMM according to the present invention.

An overview of an embodiment of how the invention can be implemented will be described below. In this case, the invention is implemented as part of a CMM 100. FIG. 1 shows a CMM 100 with its protective housings/covers (e.g. "main" covers/"hard" covers) removed so that the relevant components of the CMM 100 can be seen.

As shown, a tool, for example an inspection device such as a probe 102 for inspecting a workpiece, can be mounted on the CMM 100. In the embodiment shown, the probe 102 is a contact probe, in particular a contact analogue scanning probe, for measuring the workpiece by a stylus tip of the probe contacting the workpiece. However, as will be understood the CMM 100 could carry any sort of inspection device, including touch-trigger probes, non-contact (e.g. optical) probes, or another type of instrument if desired.

In the embodiment shown, the CMM 100 is a gantry-style Cartesian CMM and comprises a platform 101 on which an artefact to be inspected can be placed, and a movement system which provides for repeatable and accurate control of the position of the probe 102 relative to the platform 101 in three orthogonal degrees of freedom X, Y and Z.

In particular, the movement system comprises a cross-beam 106, a carriage 108, and a quill 110. The cross-beam 106 extends between first 112 and second 114 raised guideway/rail members and is configured to move along the guideways/rails along a Y axis via a bearing arrangement (in this embodiment an air bearing arrangement). The carriage 108 sits on and is carried by the cross-beam 106, and is moveable along the cross-beam along an X axis via a bearing arrangement (in this embodiment an air bearing arrangement). The quill 110 is held by the carriage 108, and is moveable relative to the carriage 108 along a Z axis via a bearing arrangement (again, in this embodiment via an air bearing arrangement).

As will be understood, motors (not shown), for example direct drive motors such as linear motors, can be provided for effecting the relative motion of the various members along their axis. Also, position encoders (not shown) can be provided for reporting the position of the cross-beam 106, carriage 108 and/or quill 110.

In the particular example shown, an articulated head 116 is provided on the lower free end of the quill 110 for carrying the probe 102. In this case, the articulated head 116 comprises two orthogonal rotational axes. Accordingly, in addition to the three orthogonal linear degrees of freedom X, Y and Z, the probe 102 can be moved about two orthogonal rotational axes (e.g. A and B axes). A machine configured with such an articulated head is commonly known as a 5-axis machine.

Articulated heads for tools and inspection devices are well known, and for example described in WO2007/093789. As will be understood, an articulated head need not necessarily be provided, and for example the probe 102 could be mounted to the quill assembly 110 via a fixed head which does not provide any rotational degrees of freedom. Optionally, the probe itself can comprise an articulated member so as to facilitate rotation about at least one axis.

As is standard with measuring apparatus, a controller 118 can be provided which is in communication with the CMM's motors and position encoders (not shown), the articulated head 116 (if present) and the probe 102 so as to send and/or receive signals to and/or from them so as to control the motion of the relatively moveable members as well as receive feedback and measurement data. A computer 120, e.g. a personal computer (which can be separate to or integrated with the controller 118) can be provided which is in communication with the controller 118. The computer 120 can provide a user friendly interface for an operator to, for example, program and initiate measurement routines. Suitable computers and associated control/programming software is widely available and well known. Furthermore, a joystick 121 or other suitable input device can be provided which enables an operator to manually control the motion of the probe 102. Again, such joysticks are well known and widely available.

The structure of the carriage 108 will be described in more detail with reference to FIGS. 3 to 8. As shown, in this embodiment the carriage 108 predominantly comprises a plurality of planar load-bearing members/facets formed from a plurality of sheets and/or plates of material (200 to 228) arranged to provide a box-like load-bearing structure. In this particular example, the carriage 108 is made from a combination of sheets and plates of material of different thicknesses. For example sheets 200 to 218 having a sheet thickness of not more than 5 mm (and in this example have a thickness of approximately 3 mm) and a plurality of plates 220 to 228 having a plate thickness of more than 5 mm (and in this case have a thickness of 8 mm). However, this need not necessarily be the case, and for example all of the planar load-bearing members could be formed from sheets or plates of material having substantially the same thickness. In this example, the sheets/plates are formed from the same material, in particular the same metallic material, for example aluminium.

Figure 2:
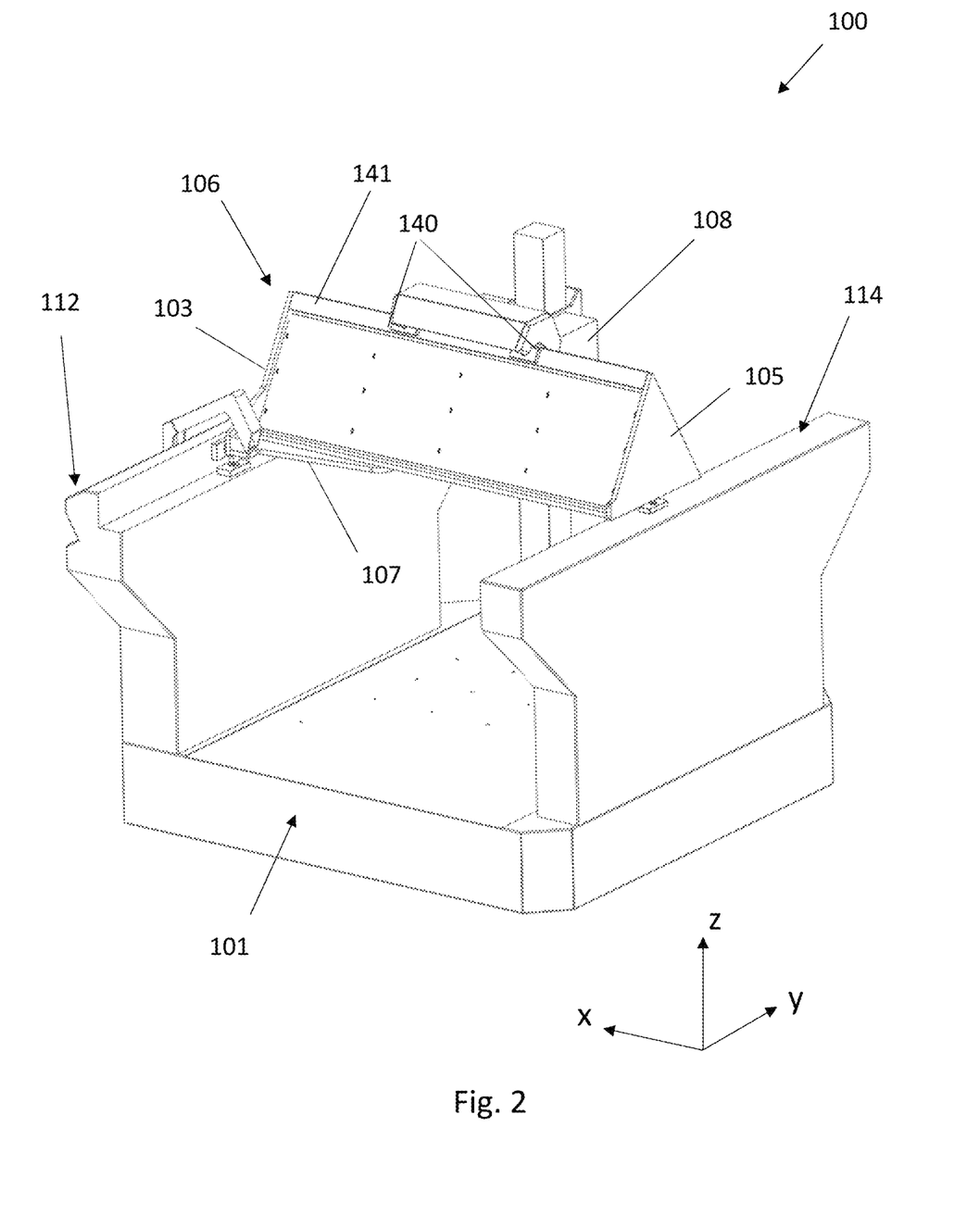
FIG. 2 is a schematic isometric view of the rear of the CMM of FIG. 1.
Figure 3:
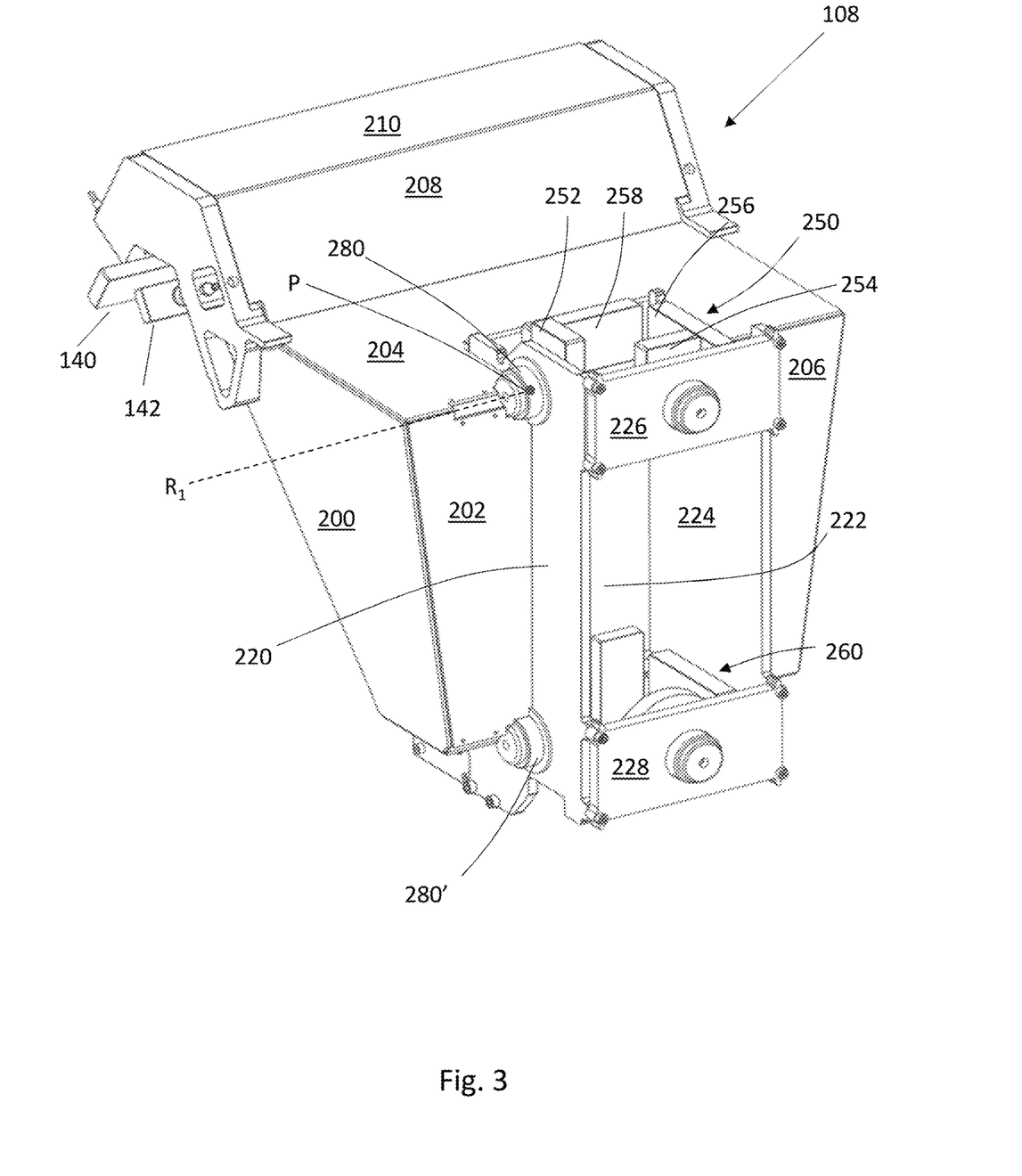
FIG. 3 is an isometric view of the carriage of the CMM of FIGS. 1 and 2.
Figure 4:
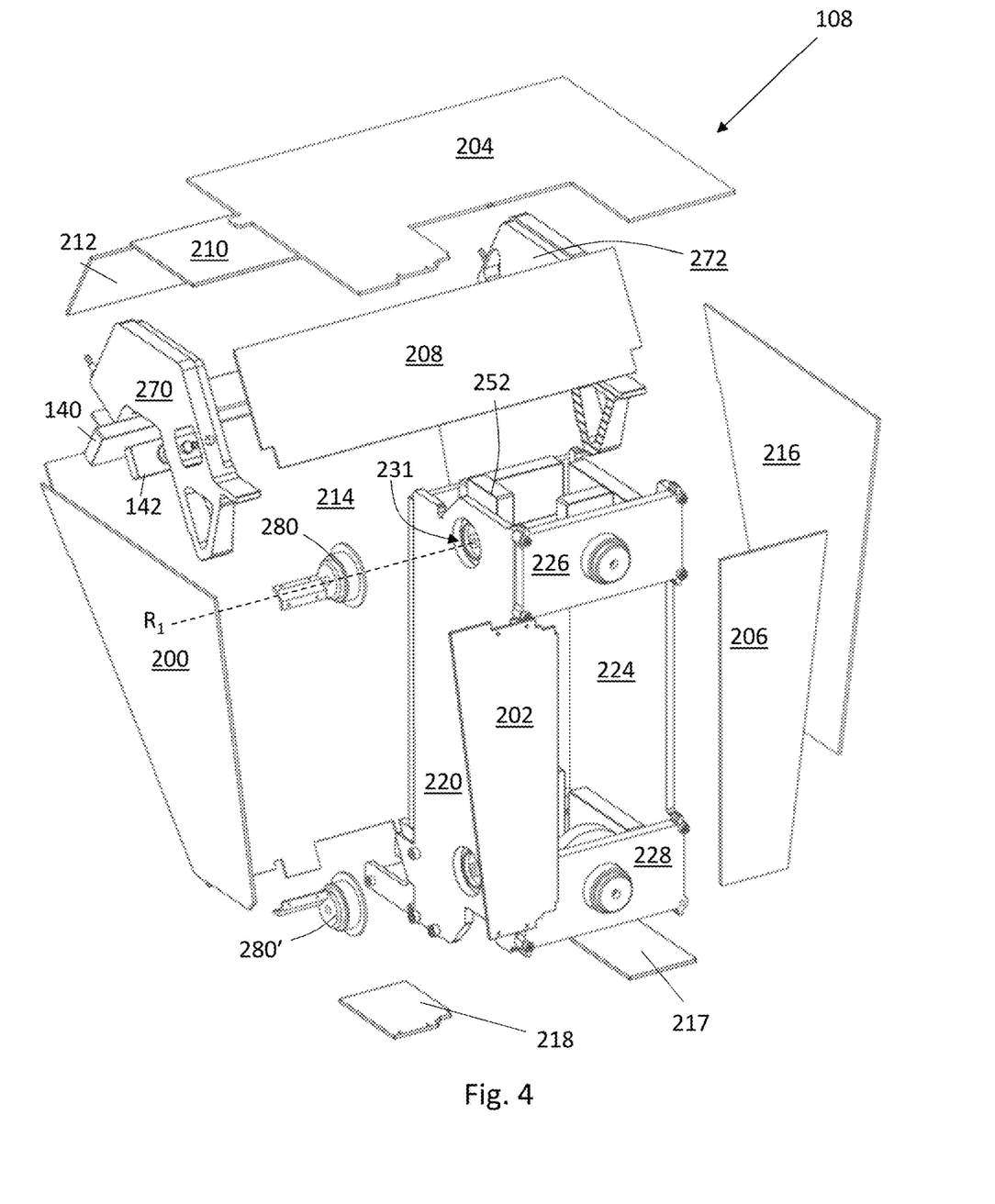
FIG. 4 is an exploded isometric view of the carriage of the CMM of FIGS. 1 and 2.
Figure 5:
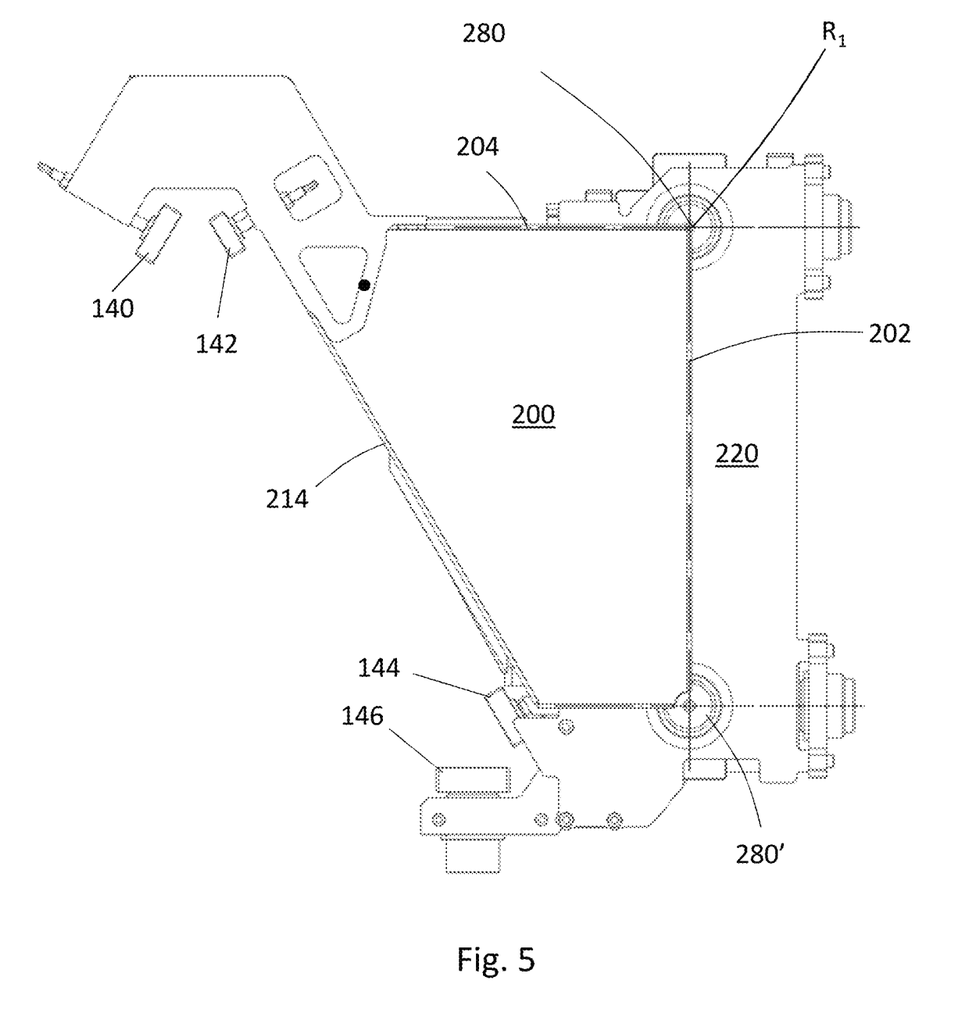
FIG. 5 is a side view of the carriage of the CMM of FIGS. 1 and 2.

The carriage 108 comprises a plurality of air bearings 140, 142 which straddle the top corner of the cross-beam 106 and bear against first and second 141, 143 bearing surfaces, and a plurality of air bearings 144, 146 (not visible in FIGS. 1 and 2, but one of each of which are shown in FIG. 5) which straddle the bottom front corner of the cross-beam 106 and bear against first 145 and second (not visible) bearing surfaces.

The air bearings 140, 142 which straddle the top corner of the cross-beam 106 are mounted to the carriage's load-bearing structure via mounting brackets 270, 272. In this example, these mounting brackets 270, 272 are formed from the same material as the sheets/plates of the carriage's load-bearing structure, for example aluminium. The mounting brackets can be formed via extrusion, for example, and could be substantially thicker than the thickness of the sheets/plates (e.g. could be at least 20 mm thick). Similar mounting brackets (not shown) can be used for mounting the air bearings 144, 146 which straddle the bottom corner of the cross-beam 106.

The carriage 108 also comprises a plurality of air bearings for guiding and facilitating relative movement of the quill 110 in the Z-dimension. As shown in the Figures (e.g. FIG. 3), the carriage 108 carries an upper set of air bearings 250 and a lower set of air bearings 260 for the quill 110. Each of the upper 250 and lower 260 sets of air bearings comprises at least one air bearing for each of the faces of the quill 110. Furthermore, each of the upper 250 and lower 260 sets of air bearings comprises at least one preload air bearing configured to urge preload the carriage 108 and quill 110 against each other. In this embodiment, the first 252 and second 254 air bearings are spring loaded (as explained in more detail below) so as to provide said preload. A similar preload arrangement can be used for the lower set of air bearings 260.

As shown in FIGS. 3 to 7 a first mount in the form of a mounting block 280 is provided for mounting the first air bearing 252 to the carriage's load-bearing structure. In particular, with reference to FIGS. 7a and 7b, the mounting block/load spreader 280 comprises a machined aluminium block which comprises a socket formation 282 at a first end (which provides a socket 283) and a corner connector part 284 at another end. As shown, in FIG. 6, the socket 283 of the socket formation 282 is configured to receive a spring 290 which sits between the inside surface of the socket formation 282 of the mounting block 280 and the back of the first air bearing 252 so as to bias the first air bearing 252 against the quill 110.

The corner connector part 284 has an elongate form, and provides first 286 and second 288 planar faces arranged such that they can sit flush against the inside surfaces of first 202 and second 204 sheets of the carriage 108. In particular, when assembled, the first planar face 286 of the mounting block 280 sits flush against and is joined to (e.g. via welding or adhesive) the inside surface of the first sheet of material 202 of the carriage, and the second planar face 288 of the mounting block 280 sits flush against and is joined to (e.g. via welding or adhesive) the inside surface of the second sheet of material 204 of the carriage. Furthermore, the outside surface of the socket formation 282 is joined to (e.g. via welding or adhesive) the edge of a hole 231 (see FIG. 4) in the first plate 220 (e.g. along the dashed line 289 shown in FIGS. 7a and 7b). Accordingly, when assembled, the air bearing 252 is mounted to the carriage 108 via a mounting member/load spreader (i.e. the mounting block 280) which is coupled to three mutually adjoining non-parallel planar load-bearing members of the carriage's load-bearing structure (i.e. to the first 202 and second 204 sheets and the first plate 220).

Figure 6:
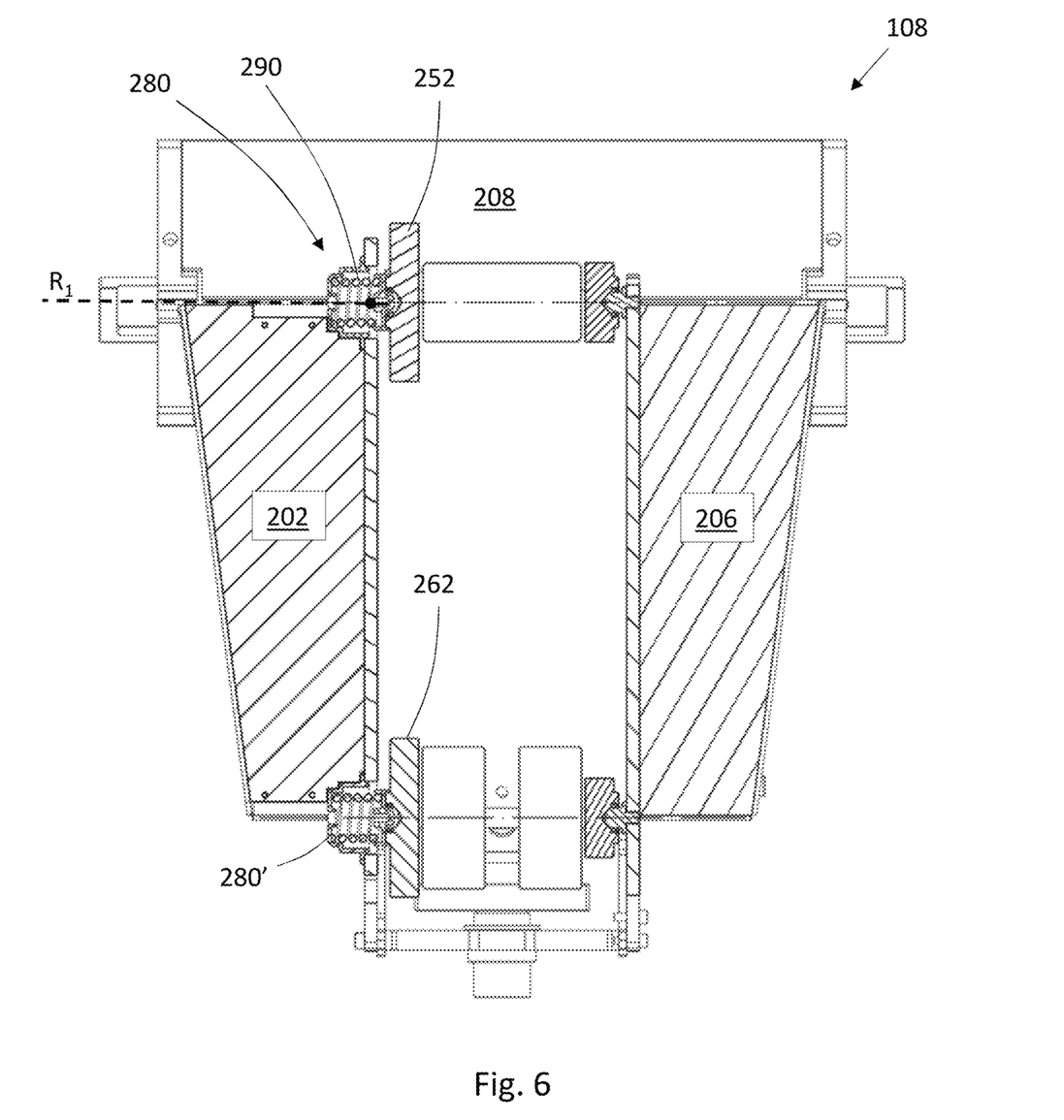
FIG. 6 is a cross-sectional front view of the carriage of the CMM of FIGS. 1 and 2.
Figure 7A:
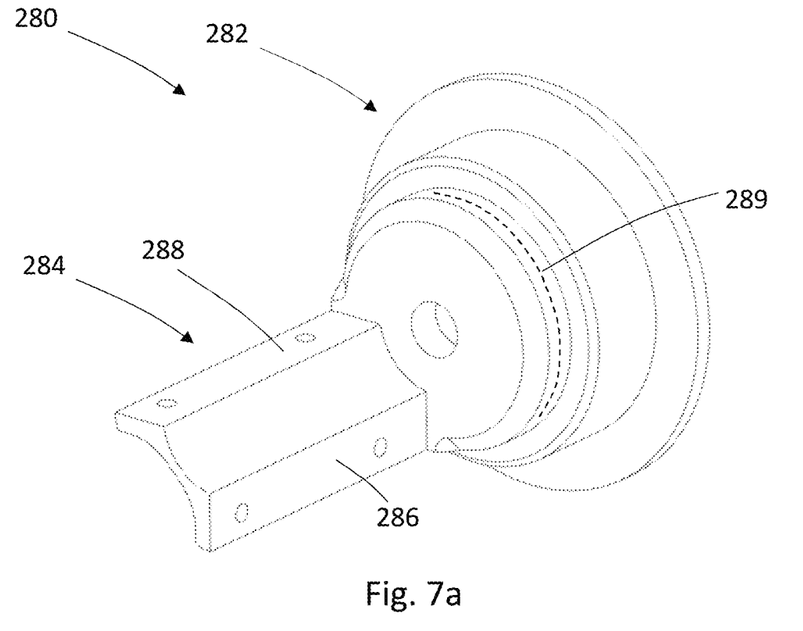
FIGS. 7a and 7b are isometric views of the bearing mount/load spreader used in the carriage shown in FIGS. 3 to 6.
Figure 7B:
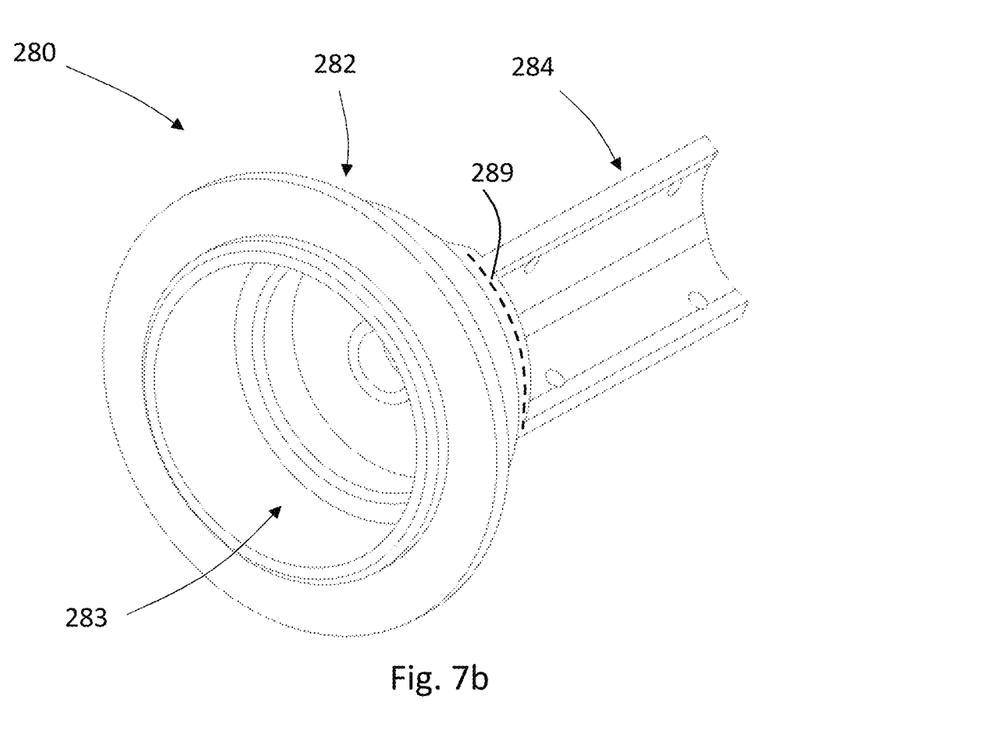

Furthermore, in this particular example, as illustrated in FIGS. 5 and 6, the carriage 108 is configured such that the line $R_1$ of the resultant reaction force on the first air bearing 252 passes through the corner (identified by point P in FIGS. 3 and 6) at which the planes of the first 202 and second 204 sheets and the first plate 220 of the carriage's load-bearing structure meet/intersect each other. In particular, the line $R_1$ of the resultant reaction force on the first air bearing 252 passes close to (and preferably through) a notional volume defined by the intersection of a first pair of planes containing the front and back surfaces of the first sheet 202, a second pair of planes containing the front and back surfaces of second sheet 204 and a third pair of planes containing the front and back surfaces of the first plate 220, such that the resultant reaction force can predominantly (and preferably substantially) resolved directly into any, and optionally all, of the first 202 and second 204 sheet and the first plate 220. This can help to ensure that substantially no bending moments are imparted into the sheet/plates of the carriage's load-bearing structure, despite large (e.g. 200 Newtons or more) preload forces being imparted on the bearings. Such a configuration can help to facilitate a highly accurate lightweight CMM structure, by enabling the use of relatively thin plate and sheet material (e.g. sheets of not more than 5 mm thickness) for at least some of the planar load-bearing members, without substantial bending of the structure, and without significant risk of buckling of the load-bearing structure. As will be understood, although it can be preferred that the line $R_1$ of the resultant reaction force on the first air bearing 252 passes through such notional volume, it can be adequate for the line $R_1$ of the resultant reaction force to pass close to such volume, so as to avoid substantial bending moments. For example, it can be sufficient if the line $R_1$ of the resultant reaction force passes through a notional greater volume which is centred on the notional volume, but has a width, depth and height which is up to five times that of the notional volume. Optionally, it can be sufficient if the line $R_1$ of the resultant reaction force passes through a notional region which is centred on the point at which the planes of the first 202 and second 204 sheets and the first plate 220 of the carriage's load-bearing structure meet/intersect each other, and has a radius of 50 mm.

The first air bearing 262 of the lower set 260 of air bearings can be mounted to the carriage 106 in the same way, e.g. via an identical bearing mount 280', which is mounted to the first plate 220, and first 202 and third 218 sheets.

Figure 8A:
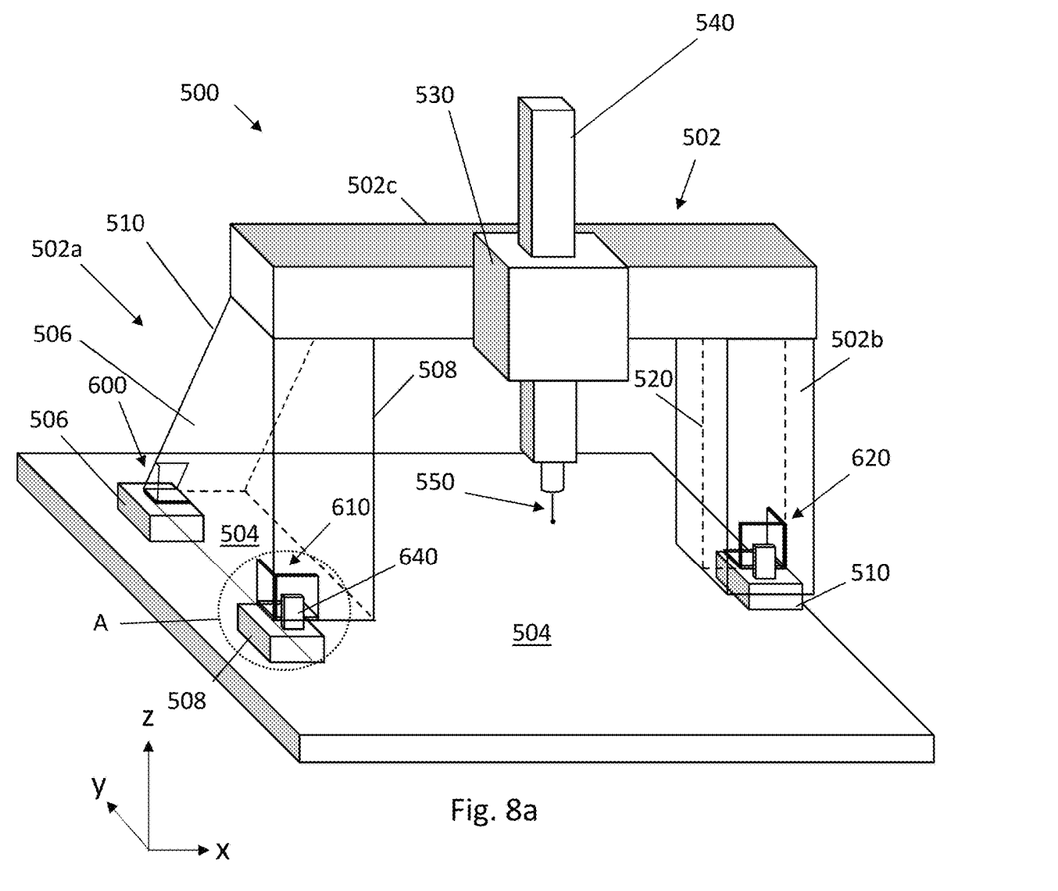
FIG. 8a is a schematic isometric view of the front of a portal-type Cartesian CMM according to the present invention.
Figure 8B:
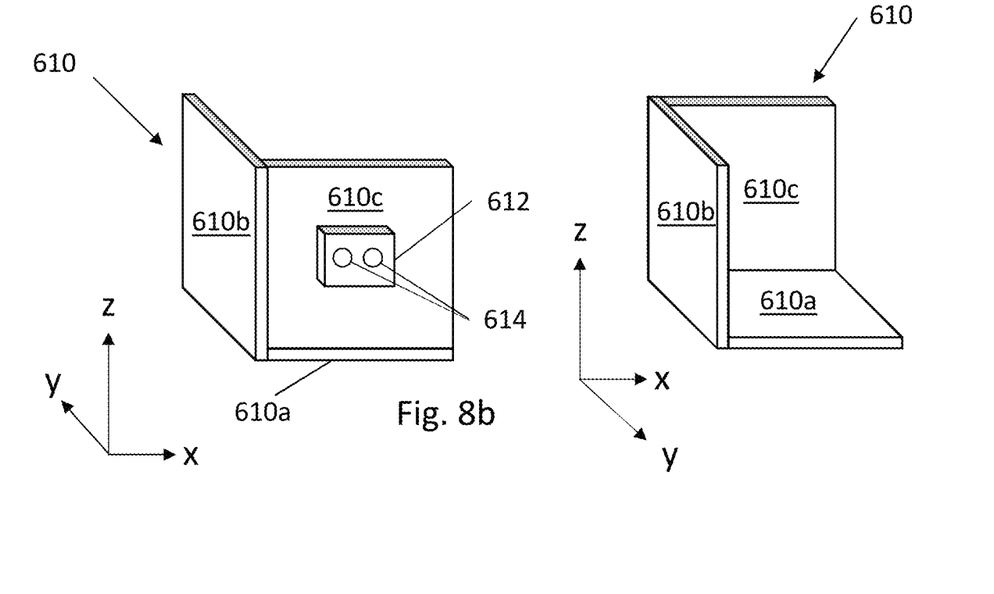
Figure 8C:
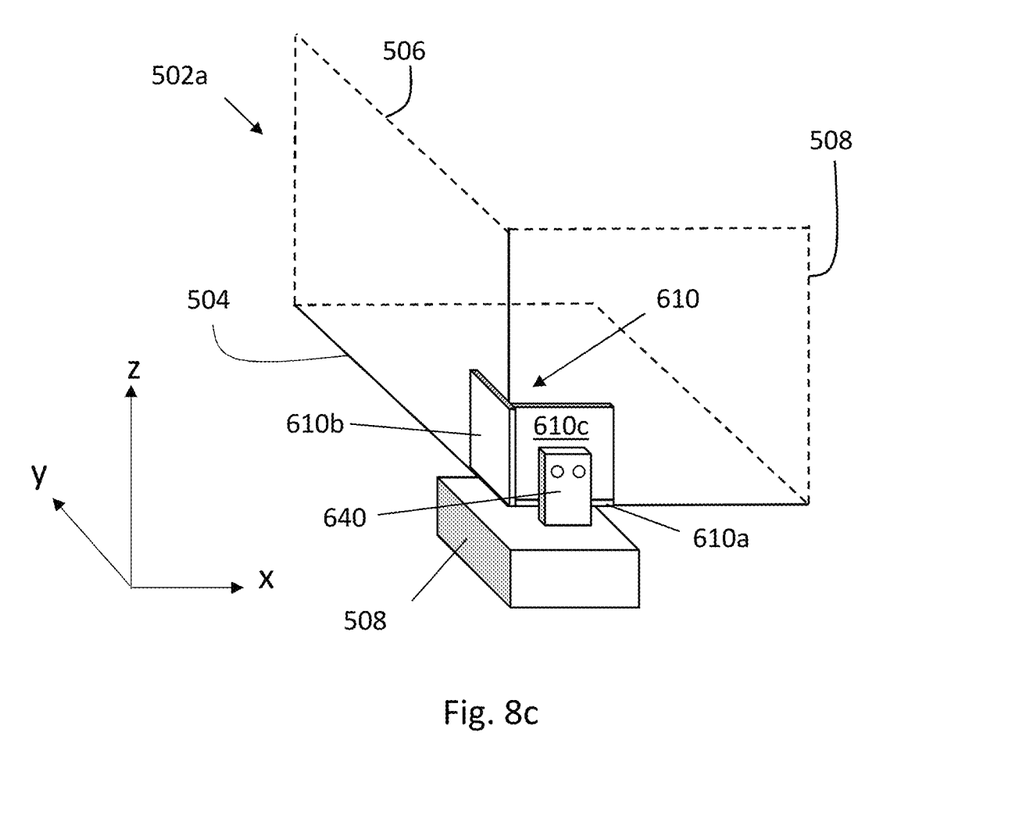

FIGS. 8a to 8c schematically illustrate an alternative embodiment of the invention. In this case, a movement apparatus 500 (for example a portal-type CMM) comprises a portal frame 502 that is moveable relative to a platform 504 in the Y-dimension. As schematically shown, the portal frame 502 comprises first 502a and second 502b legs and a bridge piece 502c. A carriage 530, quill 540 and probe arrangement 550 the same as or similar to those described above in connection with FIGS. 1 and 2 could be supported by and movable along the bridge 502c. As will be understood, as with the embodiment of FIGS. 1 and 2, motors, encoders and controllers can be provided for controlling motion and reporting positions of the relative parts of the apparatus. As will also be understood, there can be provided means for constraining/preventing movement of the portal frame 502 in the X dimension (e.g. the bearings 506, 508 could sit in a groove, be biased against an upstanding ledge, or additional bearings could be provided so as to constrain the X position of the portal frame 502).

The first 502a and second 502b legs (and the bridge piece 502c) comprise a sheet material load-bearing structure. In particular, they each comprise at least one sheet arranged to provide a load-bearing structure (e.g. one piece of sheet material folded to provide the load-bearing structure or a plurality of pieces folded and/or connected to provide the load-bearing structure). In this embodiment, the sheets comprise stainless steel sheets less than 1 mm thick. The use of such thin sheet material can be facilitated by the way in which the bearings are mounted to the portal frame 502. In particular, the first 506 and second 508 air bearings are mounted to the sheet material structure of the first leg 502 via first 600 and second 610 mounting members/load spreaders, and the third bearing member 510 is mounted to the second leg 502b via a third mounting member/load spreader 620. FIG. 8b shows front and rear views of the second mounting member 610 in isolation. As shown, the mounting member/load spreader comprises three planar, mutually orthogonal faces (first 610a, second 610b, third 610c faces) arranged to provide a corner-shaped configuration. As will be understood, there are various suitable ways of making the mounting members/load spreaders, e.g. by welding individual plates together, by machining a single block of material, or via casting. As will also be understood, the mount/load spreader could take other forms; for example it could have other sides, e.g. making it have the form of a whole cube. Optionally it doesn't need to have a thin walled/shell-like construction; for example it could comprise a solid lump (e.g. cube) of material.

A connector block 612 comprising a pair of threaded holes 614 is provided on the outer face of the third face 610c of the second mounting member 610.

As schematically shown in FIG. 8c, the second air bearing 508 is secured to the second mounting member 610 via a coupler device 640. In particular, the coupler device 640 is secured to the connector block 612 (not visible in FIG. 8c) via mechanical fasteners (in this case a pair of threaded bolts which pass through a pair of holes in the coupler device 640 and engage the pair of threaded holes 614 on the connector block 612). As will be understood, the second air bearing 508 could be coupled to the coupler device 640 such that they are rigidly fixed relative to each other in all degrees of freedom, or the second air bearing 508 could be coupled to the coupler device 640 such that the second air bearing 508 and coupler device 640 have some degree of compliance in at least one degree of freedom, for example a rotational degree of freedom, (e.g. can pivot relative to each other about the X-axis) so as to accommodate small deviations in the guideway on which the second air bearing runs.

As also shown in FIG. 8c, the first 610a, second 610b and third 610c faces are configured such that they fit flush against, and are secured to (e.g. via mechanical fasteners, welding and/or adhesive), the inside surfaces of corresponding first 504, second 506 and third 508 planar load-bearing members provided by the sheet material load-bearing structure of the first leg 502a. Accordingly, as will be understood, the connector block 612 will protrude at least part-way through a hole in the third planar load-bearing member 508.

Figure 8D:
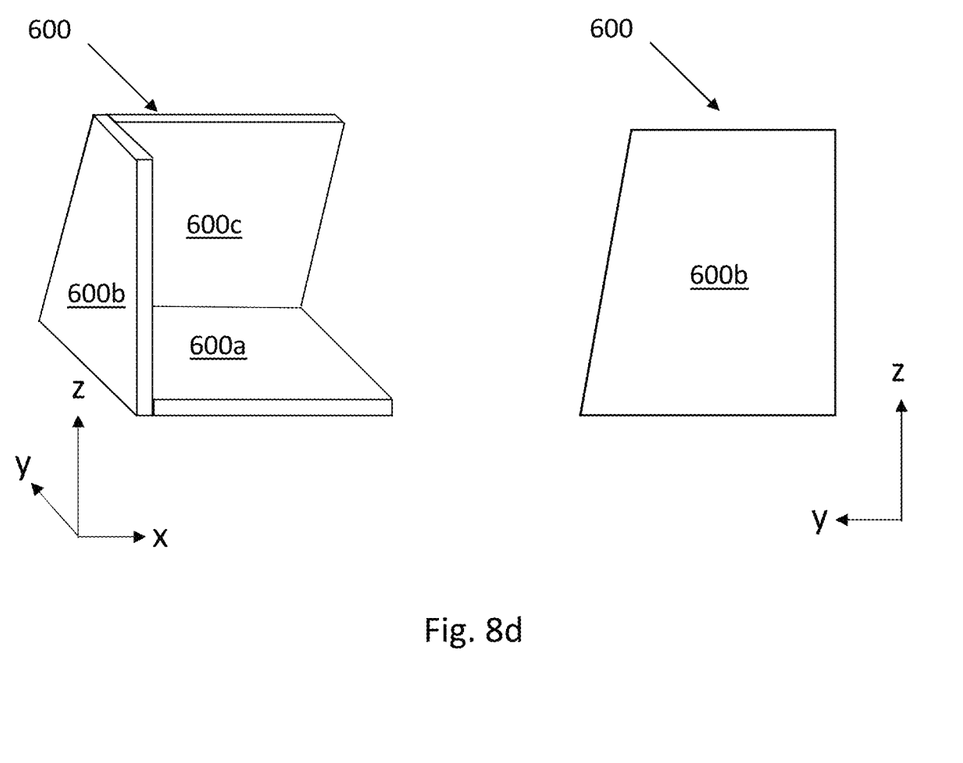

As shown in FIG. 8a, the first air bearing member 506 is located at the back of the first leg 502a. However, unlike the front face of the first leg 502a which extends vertically, the back face of the first leg 502a slopes at an angle to the vertical (i.e. at an angle to the Z-axis). Accordingly, as shown in FIG. 8d (which shows a perspective rear view, and a side view of the first mounting member 600), unlike the second mounting device 610, the first mounting member 600 does not have three mutually orthogonal faces. Rather, it has three faces (first 600a, second 600b, third 600c faces), wherein the plane of the third face 600c slopes at a non-perpendicular to the plane of the first face 600a. Accordingly, as schematically shown in FIG. 8a, this means that the first mounting member 600 is configured such that its first 600a, second 600b and third 600c faces fit flush against, and are secured to (e.g. via mechanical fasteners, welding and/or adhesive), corresponding first 504, second 506 and fourth 510 planar load-bearing members provided by the sheet material load-bearing structure of the first leg 502a.

As per the second bearing 508, the first bearing 506 can be connected to the first mounting member 600 via a coupler device (not shown) and mechanical fasteners.

Rather than securing the mounting member to an outer wall/shell of the load-bearing structure (i.e. as per the first 600 and second 610 mounting members), it is possible to secure the mounting member to an inner planar load-bearing member, such as that provided by a sheet material bulkhead. For example, as schematically illustrated in FIG. 8a, one of the faces the third mounting member 620 (which is identical to the second mounting member 610), in this case the face extending in the XZ plane, fits flush against and is welded (or adhered) to an inner planar load-bearing member 520 provided by a sheet material bulkhead, schematically illustrated by the plane identified by the dashed line in the second leg 502b. As shown, the other faces of the third mounting member) are secured to the sheet material bottom and side outer walls of the second leg 502b.

The mount/load spreader of the above described embodiments are connected to only three non-parallel planar load-bearing members of the first body. In other words, the mount is connected to three non-parallel planar load-bearing members of the first body, in which each of the planar load-bearing members share a boundary along a line with the other two planar load-bearing members, e.g. such that they form a three-sided pyramidal-shaped corner feature. As will be understood, this need not necessarily be the case and the mount/load spreader could be configured so as to connect to four or more non-parallel planar load-bearing members. For example, the load spreader 610 of FIG. 8b could comprise a fourth planar side which could be mounted to an internal planar bulkhead in the leg 502a of the portal 500. The plane of the fourth planar side could be parallel to the planes of one of the other three sides 610a, 610b, 610c, or could be non-parallel to all of them.

The above described embodiments describe the mount/load spreader being used as a bearing mount. As will be understood, the mount/load spreader could be used for mounting other types of device/object to the sheet/plate material load bearing structure. For example, it could be used to mount a cover of the CMM to the sheet/plate material load bearing structure (e.g. to the carriage). As will also be understood, the mount could be secured to just two non-parallel planar load-bearing members of the (e.g. closed) box load bearing structure.

The invention claimed is:

1. A coordinate positioning apparatus comprising first and second relatively moveable bodies, at least the first body comprising at least one sheet or plate of material arranged to provide a load-bearing structure comprising a plurality of planar load-bearing members and on which at least one member is mounted to the first body via a mount which is coupled to at least three, non-parallel planar load-bearing members of the first body, such that the planes of said at least three non-parallel planar load-bearing members intersect each other at a common point.

2. A coordinate positioning apparatus as claimed in claim 1, in which the mount is coupled to the at least three non-parallel planar load-bearing members of the first body substantially in the corner at which said planar load-bearing members converge toward.

3. A coordinate positioning apparatus as claimed in claim 1, in which the at least one sheet or plate of material is arranged to form a substantially closed box load-bearing structure.

4. A coordinate positioning apparatus as claimed in claim 1, in which said at least three non-parallel planar load-bearing members are substantially mutually orthogonal to each other.

5. A coordinate positioning apparatus as claimed in claim 1, in which the mount is secured over an expanse of the face at least one of the at least three non-parallel planar load-bearing members.

6. A coordinate positioning apparatus as claimed in claim 1, in which the thickness of the at least one sheet or plate of the at least one of the at least three non-parallel planar load-bearing members to which the mount is coupled is not more than 5 mm.

7. A coordinate positioning apparatus as claimed in claim 1, in which the first and second bodies are relatively moveable in a linear degree of freedom.

8. A coordinate positioning apparatus as claimed in claim 1, in which the mount comprises the same material as the material of the planar load-bearing member to which it is secured.

9. A coordinate positioning apparatus as claimed in claim 1, in which the at least one member comprises a bearing member mounted for cooperation with, and preloaded against, a bearing surface on the second body.

10. A coordinate positioning apparatus as claimed in claim 9, in which the mount and the bearing member are adjustable relative to each other in at least one degree of freedom.

11. A coordinate positioning apparatus as claimed in claim 9, in which the line of a resultant reaction force on the first bearing member passes close to or through the point of intersection of the planes of the at least three non-parallel planar load-bearing members.

12. A coordinate positioning apparatus as claimed in claim 9, comprising a biasing member between the mount and the bearing member configured to provide said preload.

13. A coordinate positioning apparatus as claimed in claim 9, in which the bearing member comprises an air bearing.

14. A coordinate positioning apparatus as claimed in claim 1, in which said mount is secured to the inside surface of at least one of the at least three non-parallel planar load-bearing members.

15. A coordinate positioning apparatus as claimed in claim 1, in which said at least one sheet or plate of material is sheet or plate metal.

16. A coordinate positioning apparatus as claimed in claim 1, in which said at least three, non-parallel planar load-bearing members of the first body are substantially adjoining, and optionally substantially mutually adjoining.

17. A coordinate positioning apparatus as claimed in claim 1, in which the at least one member comprises a machine cover.

18. A coordinate positioning apparatus as claimed in claim 1, in which the coordinate positioning apparatus is a Cartesian coordinate positioning apparatus.

19. A Cartesian coordinate positioning apparatus comprising first and second relatively moveable bodies, at least the first body comprising at least one sheet or plate of material arranged to provide a load-bearing structure comprising a plurality of planar load-bearing members and on which at least one first bearing member is mounted for cooperation with, and preloaded against, a bearing surface on the second body, and in which the at least one first bearing member is mounted to the first body via a mount which is coupled to at least three, non-parallel planar load-bearing members of the first body, such that the planes of said at least three non-parallel planar load-bearing members intersect each other at a common point.

* * * * *